J. W. WHITFORD.
WELDING OR CUTTING APPARATUS.
APPLICATION FILED MAR. 4, 1911.
1,028,166.
Patented June 4, 1912.
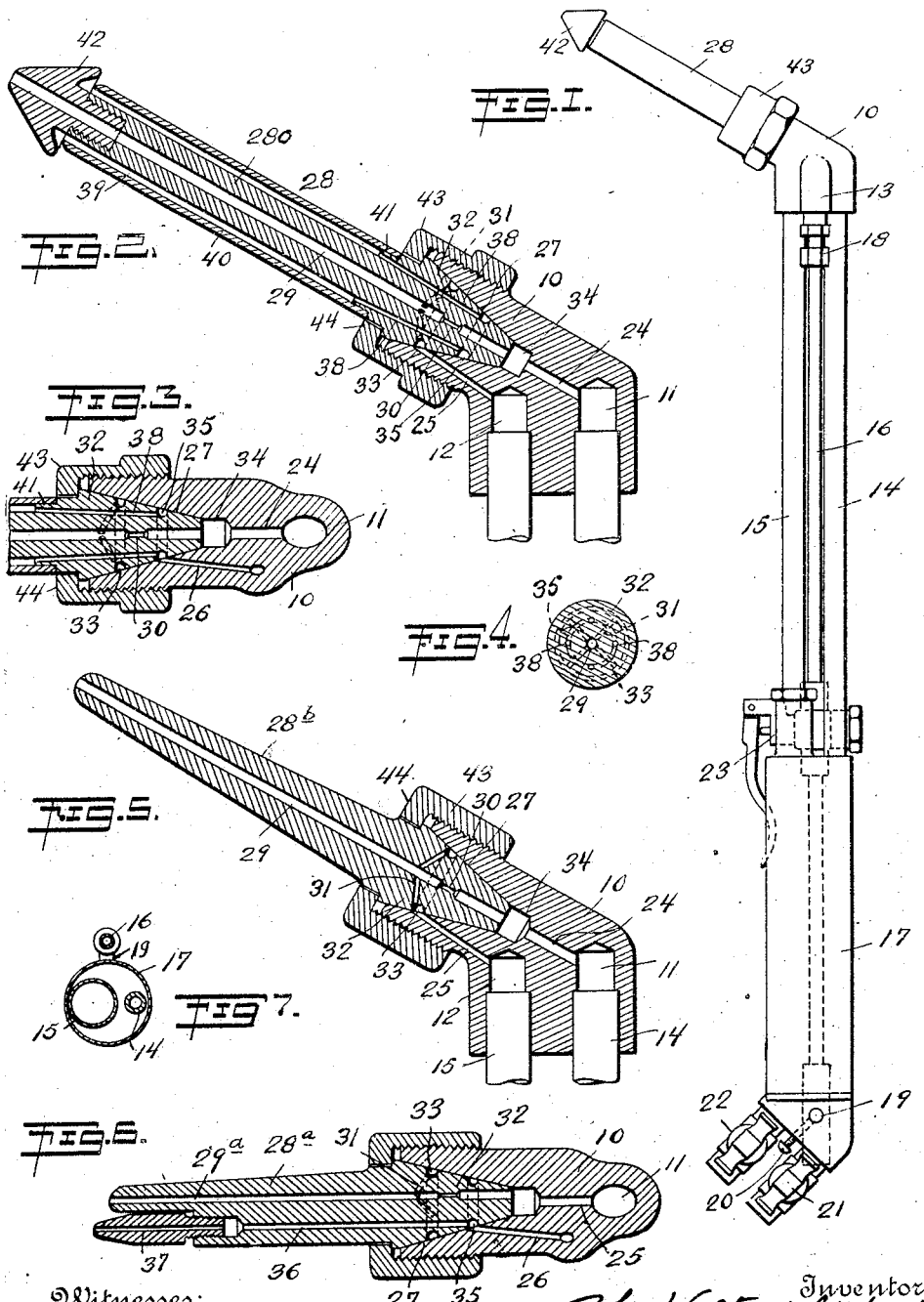

UNITED STATES PATENT OFFICE.

JOHN WALTER WHITFORD, OF JERSEY CITY, NEW JERSEY, ASSIGNOR TO DAVIS-BOURNONVILLE ACETYLENE DEVELOPMENT COMPANY, OF PIERRE, SOUTH DAKOTA, A CORPORATION OF SOUTH DAKOTA.

WELDING OR CUTTING APPARATUS.

1,028,166.  Specification of Letters Patent.  Patented June 4, 1912.

Application filed March 4, 1911. Serial No. 612,189.

*To all whom it may concern:*

Be it known that I, JOHN WALTER WHITFORD, a citizen of the United States, a resident of Jersey City, in the county of Hudson and State of New Jersey, have invented certain new and useful Improvements in Welding or Cutting Apparatus, of which the following is a specification.

This invention relates to apparatus for heating, brazing, welding or cutting, or otherwise treating, metals by means of jets of gases directed upon the work.

The apparatus is designed more especially for using oxygen and acetylene under pressure. Such a device is commonly known as an oxy-acetylene torch or blow-pipe. In such apparatus it is customary to supply a number of removable and interchangeable tips for each torch or head, these tips varying in size and in the dimensions of the passages therein so that flames of different sizes and qualities for different kinds of work may be had.

In the form of apparatus which has proved practically successful the mixing of the combustible and combustion-supporting gases for the heating or welding flame is effected in the tip, the gases being kept separate until after they enter the tip. In this form of apparatus it is of the greatest importance to provide sure seals at the joint between the head and tip, both to seal the different kinds of gases from each other and from leakage outside of the torch.

One of the objects of the invention is to provide improved sealing means for this purpose.

The object is, further, to provide seals for as many ducts as may lead from the head into the tip.

Another object of the invention is to provide means for leading gaseous fluid other than the oxygen and acetylene for the flame through the head into the tip.

A special object is to lead such fluid through the sealing seats provided at the junction of the head and tip. Such fluid may be, for example, oxygen, usually under higher pressure than the other oxygen stream, for cutting, or air or other gaseous medium for cooling the tip and the gases passing therethrough.

The invention consists first in a detachable and interchangeable tip having means for mixing the gases for the flame therein, and a head for supplying the tip with these gases, the tip and head being formed with similar external and internal similar abrupt-angled conical seats, in which is formed an annular channel or channels for establishing communication at all relative positions of the head and tip. This annular channel, while preferably narrow for economy of space, affords a chamber of suitable capacity for supplying the communicating inlet or inlets in the head.

The conical seats contemplated by this invention have the distinctive property of separating freely upon removal of the external axially directed pressure holding the tip to the head. Such a structure is entirely different in nature and properties from a mere gentle taper. Such a taper joint is self-holding, and the less the taper the easier it is to wedge the male member irremovable into its taper socket. Such a taper joint is therefore inoperative for an oxy-acetylene blow-pipe, one of the first requirements of which is ease in interchanging the tips. When it is considered that the head and tip are drawn together by screw means, with which there is always a tendency to exert more force than is necessary, and that the head and tip remain clamped together for periods of rest that are often considerable and during which the joint is more or less effected by heat and probably also by the gases, it will be apparent why a gently tapered joint would render a torch useless because of the jamming of the tip. But with a conical joint of sufficiently abrupt angle the properties are exactly reversed. Whereas with such a taper joint as described, the greater the external compression the more the reaction of the socket, owing to friction, locks the male member against removal, with this conical joint the more the external compression the more the reaction tends to force the tip out of the socket. Hence, while with conical seats, absolutely gas-tight seals may be formed at both sides of the annular channel under the action of a separate compression member, such as a screw coupling, the tip is held in place by this coupling and not by the grasp of the conical socket, and upon release of the coupling the seats separate freely. Such conical seats should, however, be formed of sufficient acuteness of angle and of sufficiently long sides to insure ample seals at both sides of the annular channel or chamber, or alternating with as many annular channels as may be employed.

The invention also consists in a torch or the like in which a gaseous fluid, other than the oxygen and acetylene for the flame, is brought into the passage therefor in the tip, through the head, and preferably through the sealing seats between the head and tip, such seats being conical as just described, or even of other form. Thus, the invention includes both a novel form of air-cooled torch and a novel form of cutting torch, according to whether the gaseous fluid is air or other gaseous medium for cooling led to a suitable passage in the tip, or oxygen for cutting led to a special passage in the burner tip arranged to play upon the work.

In the accompanying drawings showing by way of illustration certain preferred embodiments of the invention: Figure 1 is a side elevation of the torch with an air-cooled tip; Fig. 2 is an enlarged section through the head and tip of this form of torch; Fig. 3 is a section at right angles to the last, the tip being partly broken away; Fig. 4 is a cross-section through the rear conical portion of the tip shown in these views; Fig. 5 is a view corresponding to Fig. 2, showing a welding tip without air-cooling; Fig. 6 is a section on a plane corresponding to that of Fig. 3 showing a cutting tip in the head; and Fig. 7 is a cross-section through the handle portion of the torch.

In these views the numeral 10 indicates the head, which is preferably a casting of suitable form. Three sockets 11, 12 and 13 are formed in the lower portion of this head, and three pipes 14, 15 and 16 have their ends secured therein. The pipes 14 and 15 are preferably permanently, or semi-permanently secured to the head, and together with the casing 17 constitute a convenient handle for the torch. As heretofore, the portion of the acetylene pipe or conduit 15 inside this casing may be enlarged for the reception of material for protecting the acetylene generator or tank from a flash-back, while the oxygen pipe 14 merely passes through the casing as a matter of convenience. The pipe 16 may be, and preferably is, detachably connected to the head, as by means of a screw coupling 18, and with the handle, as by means of a laterally-projecting arm 19 clamped in a hole by means of a screw 20. The three pipes or conduits are provided with suitable controlling valves 21, 22 and 23. The valve 23 is preferably merely a cut-off valve, but this is not material.

The sockets 11, 12 and 13, together with the three drilled passages 24, 25 and 26 leading therefrom, constitute separate conduits in the head. The front part of the head is provided with a conical socket 27 for the tip, and the three conduits open into this socket. In the preferred construction, the oxygen conduit 24 opens axially at the back of the socket, and the conduits 25 and 26 through the side of the socket, one in advance of the other.

The tip 28, 28ª 28ᵇ has a narrow longitudinal mixing passage or drilled opening 29 or 29ª encircled by thick walls. This passage has its discharge orifice at the front end of the tip so as to play upon the work. At the rear the tip is provided with two kinds of inlets for leading the two kinds of gases for combustion to said mixing chamber. The arrangement of these inlet passages may be varied. Preferably, there is a single axial restricted inlet 30 for the oxygen and lateral inlets 31 for the acetylene. The acetylene inlets may be, and preferably are, inclined to the mixing passage. The number and size of the inlet passages may be varied according to the particular results desired. The mixing passage 29 may be arranged axially within the tip, as shown at 29 in Fig. 2, or eccentrically, as shown at 29ª in Fig. 6.

The rear part 32 of the tip that enters the head is conical, the angle thereof and of the conical socket 27 being the same and comparatively abrupt. Both conical faces are preferably ground smooth. An annular passage, channel or recess 33 is formed within the area of these conical seats, being positioned so as to communicate directly with the acetylene conduit 25 and the acetylene inlets 31. Preferably, though not necessarily, this annular channel is formed in the conical tip portion 32. While narrow, this channel forms an adequate chamber or reservoir for the supply of the acetylene inlets. An oxygen chamber 34 may also be provided at the back of the socket 27. The zones of the conical seats at opposite sides of this annular channel form sure and ample seals, on the one hand sealing the oxygen and acetylene from each other before entering the tip and on the other hand sealing against leakage through the joint outside the torch.

The two forms of tip are provided also with a second annular passage 35 within the area of the conical seats, which annular passage may also be formed in the tip. This annular passage or recess communicates directly with the third conduit 26 in the head when the tip is in place. The conical seat sections at opposite sides of this annular communication-establishing passage form sure and ample inner and outer seals with respect to this passage, as in the other case.

In the form of tip shown in Fig. 6 the second annular passage 35 communicates with a longitudinal passage or drilled opening 36, independent of the mixing passage 29ª, which is designed to convey cutting oxygen. In the preferred construction the portion of the tip containing this oxygen passage terminates considerably short of the front end of the tip, and the passage is continued by a removable nozzle or sub-tip 37 secured to said portion, as by being screwed therein. By this means the oxygen duct is caused to discharge alongside the duct for the heating mixture, and preferably slightly in advance thereof.
In the form of tip shown in Figs. 2, 3, and 4 the annular passage 35 communicates by means of inlets 38 with a longitudinal passage 39, annular in cross-section, which surrounds the mixing passage 29. While this sheath-like passage may be formed in a variety of ways, I prefer to secure a sleeve 40, by forcing or otherwise, on an annular shoulder 41 at the base of the body part 280 of the tip; the sleeve constituting part of the tip. When this form of tip is used and the pipe 16 is connected up with a source of air under pressure, or other suitable cooling gas, instead of oxygen for cutting as in the other instance, a cooling envelope is caused to flow along or over the tip. In order to prevent this annular stream of air from mingling with the flame, a shield 42 is attached to or formed on the front end of the tip, this shield being constructed and arranged to cause the air discharged from the passage to flow back over the tip.

In both forms of tip the base of the conical part 32 is preferably larger than the adjacent part of the tip. A coupling sleeve 43 engages threads or their equivalents on the head and by means of a flange 44 presses upon this enlarged base, so as to draw the tip into the head and hold it there.

Fig. 5 illustrates a welding tip 28ᵇ without the air-cooling feature attached to the same form of head shown in the other views. This tip is essentially similar to the other forms of tip illustrated, except that it is provided with neither the annular air passage 39 nor the cutting oxygen passage 36, and consequently lacks also the annular passage 35.

In operation, the tips are instantly attachable to or detachable from the head. The conical seats separate at once upon unscrewing of the coupling. With the same torch body, either a cutting torch, an air-cooled torch or a welding torch without air-cooling may be had, by attaching one kind of tip or the other and by connecting with a source of air or cutting oxygen under pressure or neither, as the case may be. The oxygen and acetylene for the welding or cutting flame also preferably enter the torch under considerable pressure.

A material advantage of the torch provided with the cutting tip shown in Fig. 6 is that the tip may be swiveled in the head and then clamped so as to bring the jets from the mixing passage 29ᵃ and the cutting oxygen passage 36 into alinement with the desired line of cutting, with the heating flame in the lead, the passage 36 being always in communication with the duct in the head for cutting oxygen by virtue of the annular passage 35. It is the practice to advance the heating and cutting jets along the line of the cuts with the heating jet in the lead, and in order to do this, heretofore, it has often been necessary to hold the torch in an awkward manner. With my construction the torch can be held in the most convenient manner and the cutting tip adjusted so as to cut in any direction.

While I have shown and particularly described certain embodiments of my invention, it will be understood that many substitutions, omissions and changes may be made without departing from the invention.

I claim:

1. A device of the character described comprising a head provided with a conical socket and separate conduits for combustible and combustion-supporting gases, a burner tip provided with a mixing and discharge passage, separate inlets for the two kinds of gases to said passage and a conical rear portion, the surfaces of said conical tip portion and conical socket being formed as similar abrupt-angled freely-separable conical seats, of a conicity greater than the critical angle of sticking, said seats having an annular channel formed between them intermediate their length for placing one kind of said inlets in communication with the corresponding conduit in the head, the portions of the seats at opposite sides of said channel affording inner and outer gas-tight seals of ample width, and means for forcing the tip and head together, said tip being held in place by said means alone.

2. A device of the character described comprising a head provided with a conical socket and separate conduits for combustible and combustion-supporting gases, a burner tip provided with a conical rear portion, a mixing and discharge passage, and separate inlets for the two kinds of gases to said passage, the inlet for one of the gases opening through said conical portion, the surfaces of said conical tip portion and conical socket being formed as similar abrupt-angled freely-separable conical seats of a conicity greater than the critical angle of sticking, these seats having portions at opposite sides of the inlet through the conical portion of the tip affording inner and outer gas-tight seals of ample width, and means for forcing the tip and head together, said tip being held in place by said means alone.

3. A device of the character described, comprising a head and a removable and replaceable tip supported and supplied thereby, said tip having a mixing passage discharging at its forward part and inlets thereto at its rear part for the two kinds of gases to be mixed, said tip having also an independent longitudinal passage for a gaseous cooling medium, said head having conduits communicating with said inlets and a third conduit communicating with said passage for cooling medium, and the head and tip being further provided with coöperating sealing seats, sealing the three kinds of fluids from each other and from the atmosphere where the conduits in the head communicate with the said inlets and passage.

4. A device of the character described, comprising a head and a removable and replaceable tip supported and supplied thereby, said tip having a mixing passage discharging at its forward part and inlets thereto at its rear part for the two kinds of gases to be mixed, said tip having also an independent longitudinal passage for a gaseous cooling medium, said passage being annular in cross-section and encircling said mixing passage, said head having conduits communicating with said inlets and a third conduit communicating with said passage for cooling medium, and the head and tip being further provided with coöperating sealing seats, sealing the three kinds of fluids from each other and from the atmosphere where the conduits in the head communicate with the said inlets and passage.

5. In a device of the character described, a tip having a mixing passage and inlets thereto for the two kinds of gases and also a longitudinal passage for gaseous cooling fluid, and a head provided with conduits for supplying said inlets and another conduit therein for leading cooling fluid to said cooling passage.

6. Apparatus of the character described, comprising a head, three separate conduits for gaseous fluids leading into said head, said conduits being extended separately within the head, and a tip provided with a mixing passage and two sets of inlets thereto supplied by two of said conduits, said tip being also provided with a passage for a cooling gaseous medium, said passage being supplied by the third conduit.

7. In a device of the character described, a head having conduits for welding gases and a conduit for a gaseous fluid for cooling, and a removable burner structure having sealing engagement with the head, said burner structure being provided with a longitudinal passage for the welding gases and an encircling longitudinal passage annular in cross-section for the cooling fluid, said passages both being provided at the rear with inlets and means establishing communication between said inlets and conduits irrespective of relative rotation, and a shield on the forward end of the burner structure constructed and arranged to deflect the current of cooling fluid backward.

8. In a device of the character described, a head having conduits for welding gases and a conduit for a gaseous fluid for cooling, and a removable burner structure having sealing engagement with the head, said burner structure comprising a body having a shoulder on its rear part and a longitudinal passage therein for welding gases, a sleeve secured on said shoulder and forming with the body a passage annular in cross-section, the body part of the burner structure having inlet passages leading to said annular passage and an annular groove communicating on the one hand with said inlets and on the other hand with the conduit for cooling fluid in the head.

In witness whereof I have signed my name in the presence of two subscribing witnesses.

JOHN WALTER WHITFORD.

Witnesses:
C. B. WORTHAM,
WM. W. BARNES.